United States Patent
Lange et al.

(10) Patent No.: US 7,505,787 B2
(45) Date of Patent: Mar. 17, 2009

(54) BASE STATION OF A RADIO-OPERATED COMMUNICATIONS SYSTEM

(75) Inventors: Keld Lange, Ötisheim (DE); Gero Blanke, Murr (DE)

(73) Assignee: ALCATEL, Paris (FR)

( * ) Notice: Subject to any disclaimer, the term of this patent is extended or adjusted under 35 U.S.C. 154(b) by 1007 days.

(21) Appl. No.: 09/981,784

(22) Filed: Oct. 19, 2001

(65) Prior Publication Data

US 2002/0049078 A1  Apr. 25, 2002

(30) Foreign Application Priority Data

Oct. 20, 2000  (DE) ............................... 100 52 392

(51) Int. Cl.
*H04M 1/00* (2006.01)
(52) U.S. Cl. ..................... 455/561; 375/147
(58) Field of Classification Search ................. 455/561, 455/423, 424
See application file for complete search history.

(56) References Cited

U.S. PATENT DOCUMENTS

| 4,827,499 | A | * | 5/1989 | Warty et al. ................. 455/560 |
| 5,764,687 | A | * | 6/1998 | Easton ....................... 375/147 |
| 5,960,040 | A | * | 9/1999 | Cai et al. .................... 375/279 |
| 6,094,585 | A | * | 7/2000 | Dajer et al. .................. 455/522 |
| 6,138,190 | A | * | 10/2000 | Nordling ..................... 710/60 |
| 6,161,024 | A | * | 12/2000 | Komara ..................... 455/562.1 |
| 6,366,606 | B1 | * | 4/2002 | Sriram ....................... 375/150 |
| 6,366,607 | B1 | * | 4/2002 | Ozluturk et al. ............. 375/152 |
| 6,563,859 | B1 | * | 5/2003 | Oishi et al. ................. 375/148 |
| 6,600,729 | B1 | * | 7/2003 | Suzuki ....................... 370/335 |
| 2001/0034227 | A1 | * | 10/2001 | Subramanian et al. ...... 455/419 |

FOREIGN PATENT DOCUMENTS

WO  WO 97/01227  1/1997

OTHER PUBLICATIONS

Dent, P.R., "W-DCMA Reception with a DSP Based Software Radio," First International Conference on 3G Mobile Communication Technologies (Conf. Publ. No. 471) IEE London, UK, Mar. 27, 2000. XP002307360.
Honore, F. et al., "Implementation Options for WCDMA," Proceedings of 2000 International Conference on Acoustics, Speech and Signal Processing, Bd. 6, 5. Jun. 5, 2000. XP010505702.
European Search Report dated Dec. 8, 2004.

* cited by examiner

*Primary Examiner*—Sam Bhattacharya
(74) *Attorney, Agent, or Firm*—Sughrue Mion, PLLC

(57) ABSTRACT

A base station (10) of a radio-operated telecommunications system is described, which is provided with a receiver for processing received information (11) and with at least one digital signal processor (12) for performing a symbol rate processing (14). The signal processor (12) is suitable for and provided for likewise performing at least parts of a chip rate processing (13).

19 Claims, 1 Drawing Sheet

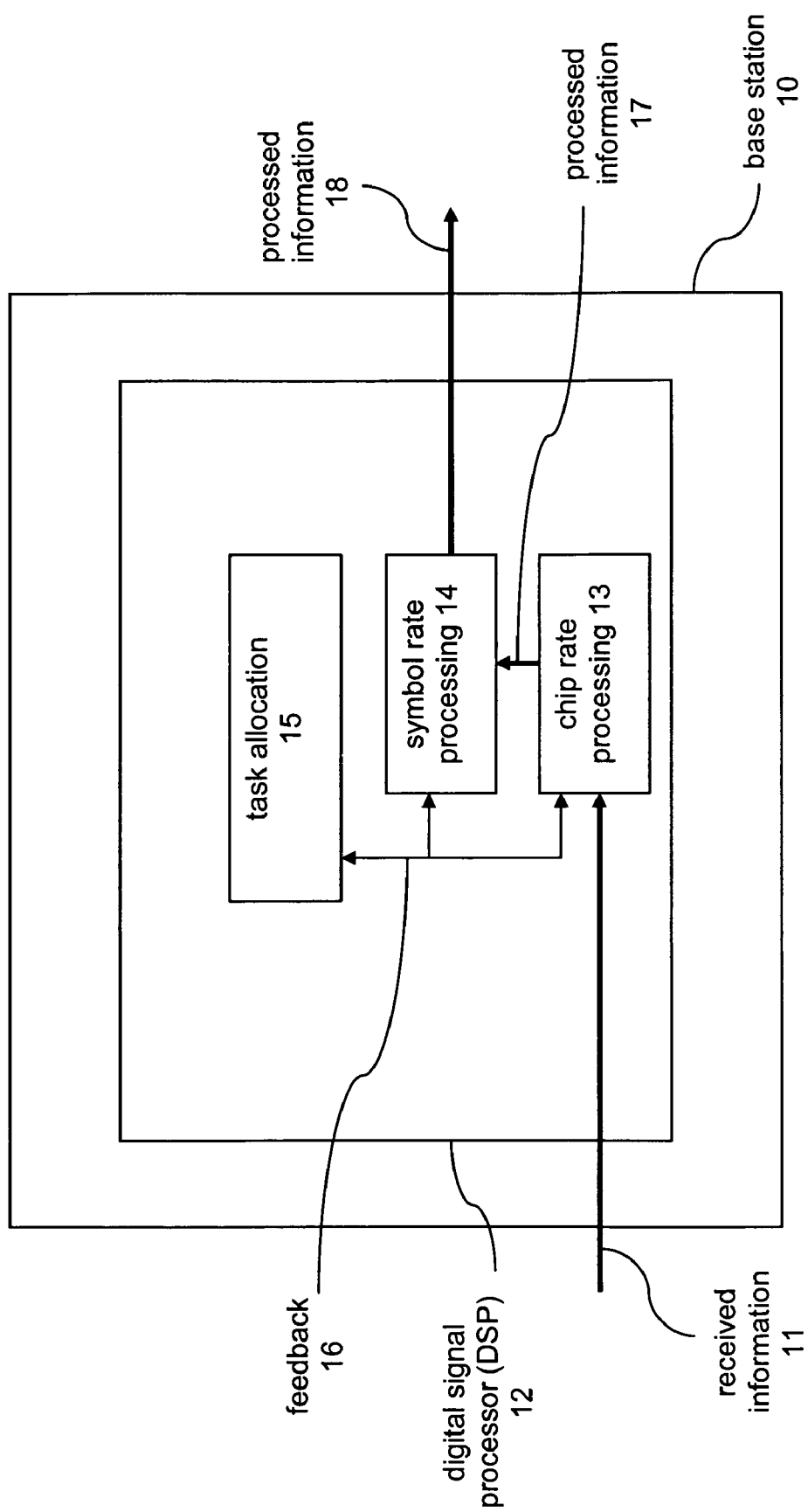

BASE STATION OF A RADIO-OPERATED COMMUNICATIONS SYSTEM

BACKGROUND OF THE INVENTION

The invention is based on a base station or a mobile station of a radio-operated telecommunications system with a receiver for processing received information and with at least one digital processor, in particular a digital signal processor, for performing a symbol rate processing. The invention likewise relates to a process for operating a radio-operated telecommunications system wherein information received by a base station or mobile station is subjected to a symbol rate processing by means of at least one digital processor, in particular a digital signal processor. The invention is based on a priority application DE 100 52 392.7 which is hereby incorporated by reference.

In a radio-operated telecommunications system, data and/or speech are transmitted in both directions between a base station and a mobile station. For the reception of the transmitted information, for example in the base station, it is necessary to perform a so-called chip rate processing and a so-called symbol rate processing. The outlay for the chip rate processing is substantially dependent upon the number of existing users. The outlay for the symbol rate processing is substantially dependent upon the existing data rate.

As is known, the chip rate processing is performed with the aid of so-called field programmable gate arrays (FPGAs) or Application Specific Integrated Circuits (ASICs), while normally so-called digital signal processors (DSPs) are used for the symbol rate processing. It will be clear that in place of the DSPs it is also possible to use other digital processors, in particular microprocessors. Here the number of the FPGAs and/or ASICs must be selected such that the chip rate processing can also still be performed in the case of the maximum possible number of users. Correspondingly the number of the DSPs must be selected such that the symbol rate processing can also still be performed in the case of the maximum possible data rate.

However, the situation is such that there are either a maximum number of users with a low data rate or a small number of users with a maximum data rate. The maximum data rate and the maximum number of users can never be present at the same time however.

This has the result that on the one hand the base station must in each instance be equipped for the described maximum situations in respect of the number of FPGAs and ASICS and the number of DSPs, whereas on the other hand these maximum situations can never occur simultaneously. Consequently either a part of the FPGAs or ASICS or a part of the DSPs is always unused, which is synonymous with an over-dimensioning of the base station in this respect.

SUMMARY OF THE INVENTION

The object of the invention is to provide a radio-operated telecommunications system which is not over-dimensioned or at least is over-dimensioned to a lesser extent.

This object is achieved in the case of a base station or a mobile station of the type described in the introduction, in accordance with the invention in that the signal processor is suitable for and provided for likewise performing at least parts of a chip rate processing.

In the case of a process of the type described in the introduction, the object is achieved in accordance with the invention in that at least a part of the chip rate processing is likewise performed by the at least one signal processor.

Thus in accordance with the invention, one or more signal processors are provided which perform both functions, thus the chip rate processing and the symbol rate processing. Consequently separate FPGAs or ASICs according to the prior art, with which the chip rate processing is performed in full, are no longer present. This former task of the FPGAs and ASICs is undertaken, in accordance with the invention, at least substantially by the at least one signal processor which is provided for the symbol rate processing.

This results in the considerable advantage that both functions can be substantially performed with one and the same signal processor. The saving in terms of components and thus costs is obvious.

In accordance with the invention it is also possible to substantially reduce or even completely eliminate the over-dimensioning, for example of the base station. If a plurality of signal processors are used to implement the invention, the possibility exists that under specific operating conditions not all of the signal processors might be needed to perform the chip rate processing and the symbol rate processing. In comparison to the prior art however, also in this case the over-dimensioning is reduced due to the absence of the FPGAs and ASICs. If only one single signal processor is used to implement the invention, this one signal processor constitutes the component minimum so that there is no longer any over-dimensioning whatsoever.

In a particularly advantageous development of the invention, firstly the chip rate processing and then the symbol rate processing is performed by the at least one signal processor. In the case of an array or group of signal processors it is likewise possible to distribute the chip rate processing and symbol rate processing between sub-arrays or sub-groups of signal processors.

In an advantageous further development of the invention, the signal processor is suitable for performing a task allocation (control function, assignment of tasks) for controlling the chip rate processing and the symbol rate processing. In this way the at least one signal processor can itself control the change-over between the chip rate processing and the symbol rate processing. In the case of the array of signal processors, these can themselves determine their distribution between the chip rate processing and the symbol rate processing.

In another advantageous development of the invention, at least one memory is provided which is suitable for and provided for intermediate storage of the received information. This can be necessary in particular in the event of a switch-over of the at least one signal processor between the chip rate processing and the symbol rate processing.

The invention likewise relates to a receiver for a base station or a mobile station of a radio-operated telecommunications system for processing received information with at least one digital signal processor for performing a symbol rate processing, where the signal processor is suitable for and provided for likewise performing at least parts of a chip rate processing.

The invention is further applied in the form of a radio-operated telecommunications system wherein a base station or a mobile station or a receiver according to the present invention is provided. Here it is particularly expedient for the telecommunications system to comprise a code division multiple access (CDMA) telecommunications system.

BRIEF DESCRIPTION OF THE DRAWINGS

Further features, possible applications and advantages of the invention will be described in the following description of exemplary embodiments of the invention which are illustrated in the drawing. Here all the described or illustrated features, both individually or in any combination, constitute the subject of the invention, irrespectively of their summarization in the claims or their dependencies and irrespective of their wording in the description and representation in the drawing.

The single FIGURE of the drawing illustrates a schematic block diagram of an exemplary embodiment of a base station according to the invention of a radio-operated telecommunications system.

In a cellular CDMA telecommunications system (CDMA=code division multiple access) a mobile station is connected to a base station via a radio link. Via this connection data and/or speech are transmitted in both directions. Data transmissions can comprise for example access to the internet or the sending of emails. Such data transmissions require a high data rate. In comparison thereto, only a low data rate is required for the transmission of speech. The data and speech transmitted between the base station and the mobile station will be commonly referred to in the following as information.

As a result of the radio connection being used, the overall data rate provided for the transmission of the information is limited. As a result the radio connection can be fully occupied in the region between two extreme situations. The extreme situations consist on the one hand of a maximum number of users with a low data rate, as is the case in particular with speech transmissions and on the other hand of a small number of users with a maximum data rate, as is the case in particular with data transmissions.

For the reception of the transmitted information it is necessary to perform a so-called chip rate processing and a so-called symbol rate processing. In the chip rate processing essentially a so-called despreading (recovery of the original information) is performed which in the CDMA telecommunications system in question is used to re-separate the transmitted information of the different users in the receiver and to assign this information to the different users. This despreading and the chip rate processing are performed with the aid of logic functions. The symbol rate processing basically comprises the decoding of the received information. Different algorithms which also contain arithmetic functions are used for this purpose.

The outlay for the chip rate processing is substantially dependent upon the number of existing users. The more users there are, the more outlay is required for the chip rate processing in order to re-separate the transmitted information in the receiver and to assign this information to the different users. In the one of the two explained extreme situations, namely in the case of a maximum number of users with low data rates, a maximum outlay is thus required to perform the chip rate processing.

The outlay for the symbol rate processing is substantially dependent upon the existing data rate. The higher the data rate, the more outlay is required for the symbol rate processing in order to decode the received information. In the other of the two extreme situations, namely in the case of a small number of users with maximum data rates, a maximum outlay is thus required to perform the symbol rate processing.

A part of a base station 10 of a radio-operated CDMA telecommunications system is illustrated in the FIGURE. In particular the FIGURE shows the receiver of the base station 10. The information received by the base station 10, which as already mentioned can consist of data and/or speech, is indicated by an arrow 11.

At this point it should be stressed that the following description of the base station 10 can also apply correspondingly to a mobile station of the CDMA telecommunications system.

For the processing of the received information 11, the base station 10 comprises a digital signal processor 12 (DSP=Digital Signal Processor). In place of the signal processor 12 it is also possible to provide another processor or microprocessor. The signal processor 12 is supplied with the received information 11. It should be noted that in place of one single DSP, two or more DSPs, in particular a DSP array or DSP group, can be provided.

The signal processor 12 is programmed such that it can perform the aforementioned chip rate processing as well as the aforementioned symbol rate processing. These functions are indicated in the FIGURE by the logical blocks 13, 14 within the signal processor 12. The blocks 13, 14 thus represent program modules which define the mode of operation of the signal processor 12.

Preferably the signal processor 12 fully performs the chip rate processing 13 and the symbol rate processing 14. However it is also possible for specific parts of these functions to be performed not by the signal processor 12 but separately, for example by means of additional hardware in the base station 10.

Furthermore, the signal processor 12 is programmed such that it can perform a so-called task allocation (control function, assignment of tasks). This comprises the control and assignment of the functions to be performed by the signal processor 12. The task allocation is indicated in the FIGURE by the further logical block 15 within the signal processor 12. Thus this block 15 is likewise a program module which defines the mode of operation of the signal processor 12.

The task allocation 15 is capable of causing the signal processor 12 to perform either the chip rate processing 13 or the symbol rate processing. The task allocation 15 is likewise provided for performing the switch-over between the chip rate processing and the symbol processing and controlling the forwarding of information possibly necessary for this purpose.

To enable the task allocation 15 to perform the aforementioned functions, the signal processor 12 is programmed such that not only can the task allocation 15 influence the chip rate processing 13 and the symbol rate processing 14 but conversely the task allocation 15 also receives feedback from the chip rate processing 13 and the symbol rate processing 14. This is indicated in the FIGURE by the bi-directional arrow 16 with which the chip rate processing 13, the symbol rate processing 14 and the task allocation 15 are coupled to one another.

In the operation of the base station 10 the following process is performed.

The signal processor 12 is firstly controlled by the task allocation 15 such that the chip rate processing 13 is performed. This means that the received information 11 is subjected to the chip rate processing 13, as indicated in the FIGURE by the arrow 11 terminating at the associated block 13.

When the chip rate processing 13 has been performed, the received information 11 is forwarded to the symbol rate processing 14, as indicated in the FIGURE by the arrow 17. For this purpose it can be necessary for the signal processor 12 to be provided with a memory for the intermediate storage of the information 11. As the information 11 is received in the form of consecutive frames, the size of the aforementioned memory must at least be suitable for storing such a frame.

Then the signal processor 12 is controlled by the task allocation 15 such that the symbol rate processing 14 is performed. The received information 11 is thus subjected to the symbol rate processing 14, as indicated in the FIGURE by the arrow 17 terminating at the associated block 14.

When the symbol rate processing 14 has been performed, the now processed information is then available at the output of the signal processor 12. This information is indicated in the FIGURE by an arrow 18. This information 18 comprises the speech and data in each case assigned to the associated user.

In the above described process, the signal processor 12 firstly performs the chip rate processing 13 and then the symbol rate processing 14. It is a precondition of this process that the signal processor 12 should be capable of processing the two extreme situations referred to in the introduction. Thus both in the case of a maximum number of users with a low data rate and in the case of a small number of users with a maximum data rate, the signal processor 12 must be suitable for, and capable of, performing the required chip rate processing and symbol rate processing.

A corresponding process can likewise be carried out when not just one single DSP, but a plurality of DSPs is provided. In this case the plurality of DSPs must be capable of processing the two aforementioned extreme situations.

Here it is expedient if, in the chip rate processing, all the DSPs are always assigned to only one user. This means that all the DSPs simultaneously process the information associated with one single user. When this information has been processed, all the DSPs are assigned to the next user and so on.

Conversely, in the case of the symbol rate processing, the information of a plurality of users can always be processed by one DSP.

If, in particular, a DSP array or DSP group is provided, an alternative process can also be implemented. Here the DSPs of the DSP array or of the DSP group are distributed between the chip rate processing and the symbol rate processing. This means that one sub-array or one sub-group of the DSPs performs the chip rate processing, while another sub-array or another sub-group of the DSPs performs the symbol rate processing quasi-simultaneously.

In this alternative process the DSPs of the DSP array or of the DSP group must then be distributed as a function of the current number of users and the current data rate. This means that the DSPs must always be distributed such that the chip rate processing and the symbol rate processing can be performed in the case of any number of users and with any data rate. This distribution can be determined and then appropriately controlled by the task allocation.

The invention claimed is:

1. A base station of a radio-operated telecommunications system comprising:
    a receiver processing received information; and
    one or more digital signal processors, wherein each of said digital signal processors is configured to perform a symbol rate processing and at least parts of a chip rate processing.

2. The base station as claimed in claim 1, wherein the signal processor is also configured to perform a task allocation for controlling the chip rate processing and the symbol rate processing.

3. The base station as claimed in claim 1, the signal processor being designed such that firstly the chip rate processing and then the symbol rate processing can be performed.

4. The base station as claimed in claim 1, wherein an array or group of digital signal processors is provided.

5. The base station as claimed in claim 4, wherein the chip rate processing and the symbol rate processing can be distributed between sub-arrays or sub-groups of signal processors.

6. The base station as claimed in claim 1, wherein at least one memory is provided which is suitable for and provided for the intermediate storage of the received information.

7. The base station as claimed in claim 1, wherein the chip rate processing comprises a despreading of the received information and wherein the signal processor is configured to dispread the received information.

8. The base station as claimed in claim 1, wherein the symbol rate processing comprises a decoding of the received information.

9. The base station according to claim 1, wherein each of said digital signal processors is configured to perform the symbol rate processing comprising decoding the received information and at least said parts of the chip rate processing comprising despreading the received information.

10. The base station according to claim 9, wherein said despreading comprises separating the received information based on sources of the received information and assigning the separated received information to a respective source.

11. A receiver for a base station of a radio-operated telecommunications system for processing received information with one or more digital signal processors, wherein each of said digital signal processors is configured for performing a symbol rate processing and at least parts of a chip rate processing.

12. A digital signal processor configured to execute symbol rate processing for a receiver of a base station of a radio-operated telecommunications system, wherein the signal processor is configured to perform at least parts of a chip rate processing.

13. A radio-operated telecommunications system comprising at least one of:
    a base station having one or more digital signal processors, wherein each of the digital signal processors is configured to perform a symbol rate processing and at least parts of a chip rate processing;
    a receiver processing received information having said one or more digital signal processors; and
    said one or more digital processors.

14. The telecommunication system according to claim 13, wherein the telecommunication system is a code division multiple access (CDMA) telecommunications system.

15. A process for operating a radio-operated telecommunications system, wherein information received by a base station is subjected to a symbol rate processing by one or more digital signal processors, wherein at least a part of the chip rate processing is performed by same processor from the digital signal processors.

16. The process as claimed in claim 15, wherein firstly the chip rate processing and then the symbol rate processing is performed.

17. The process as claimed in claim 15, wherein a task allocation for controlling the chip rate processing and the symbol rate processing is performed by the at least one signal processor.

18. The process as claimed in claim 15, wherein an array or group of digital signal processors is provided, the chip rate processing and the symbol rate processing is distributed between sub-arrays or sub-groups of signal processors.

19. The process as claimed in claim 18, wherein the distribution of the array or group of signal processors between the chip rate processing and the symbol rate processing is performed by the task allocation.

\* \* \* \* \*